(12) United States Patent
Mauldin et al.

(10) Patent No.: US 9,211,955 B1
(45) Date of Patent: Dec. 15, 2015

(54) METHODS AND APPARATUS FOR SUPPORTING ENGINES AND NACELLES RELATIVE TO AIRCRAFT WINGS

(71) Applicant: The Boeing Company, Chicago, IL (US)

(72) Inventors: Jack W. Mauldin, Mill Creek, WA (US); David W. Kwok, La Mirada, CA (US); John A. Weidler, Lynnwood, WA (US); Antonio B. Gonzales, Cypress, CA (US); Edward L. Lawson, Long Beach, CA (US); Andrew C. Kulak, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 358 days.

(21) Appl. No.: 13/710,117

(22) Filed: Dec. 10, 2012

(51) Int. Cl.
*B64D 27/00* (2006.01)
*B64D 27/26* (2006.01)
*B64D 29/00* (2006.01)

(52) U.S. Cl.
CPC ............... *B64D 27/26* (2013.01); *B64D 29/00* (2013.01)

(58) Field of Classification Search
None
See application file for complete search history.

(56) References Cited

U.S. PATENT DOCUMENTS

| | | | |
|---|---|---|---|
| 1,723,763 A | | 8/1929 | Burnelli |
| 3,848,832 A | | 11/1974 | Stanley et al. |
| 6,802,479 B2 * | | 10/2004 | Howe et al. ............... 244/129.1 |
| 7,108,224 B2 * | | 9/2006 | Pasquer et al. ............... 244/54 |
| 7,607,609 B2 * | | 10/2009 | Levert ............... 244/54 |
| 7,708,224 B2 * | | 5/2010 | Aho-Mantila et al. ............ 244/54 |
| 7,740,200 B2 * | | 6/2010 | Diochon et al. ............... 244/54 |
| 7,784,733 B2 * | | 8/2010 | Diochon et al. ............... 244/54 |
| 7,798,423 B1 | | 9/2010 | Shmilovich et al. |
| 7,931,232 B2 * | | 4/2011 | Bernardi et al. ............ 244/54 |
| 7,971,825 B2 * | | 7/2011 | Diochon et al. ............... 244/54 |
| 8,118,251 B2 * | | 2/2012 | Suciu et al. ............... 244/54 |
| 8,128,021 B2 * | | 3/2012 | Suciu et al. ............... 244/54 |
| 8,172,527 B2 * | | 5/2012 | Duchatelle et al. ......... 415/213.1 |
| 8,191,823 B2 * | | 6/2012 | Guering et al. ............... 244/54 |
| 8,226,028 B2 * | | 7/2012 | Marche ............... 244/54 |
| 8,534,597 B2 * | | 9/2013 | Baillard ............... 244/54 |
| 8,640,987 B2 * | | 2/2014 | Journade et al. ............ 244/54 |
| 8,651,416 B2 * | | 2/2014 | Journade et al. ............ 244/54 |
| 8,727,269 B2 * | | 5/2014 | Stuart et al. ............... 244/54 |
| 2007/0205324 A1 * | | 9/2007 | Diochon et al. ............ 244/54 |
| 2008/0197233 A1 * | | 8/2008 | Combes et al. ............ 244/54 |
| 2009/0084893 A1 * | | 4/2009 | Balk ............... 244/54 |
| 2009/0212155 A1 * | | 8/2009 | Huggins et al. ............ 244/54 |
| 2010/0090056 A1 * | | 4/2010 | Gardes et al. ............... 244/54 |
| 2010/0181418 A1 * | | 7/2010 | Vauchel et al. ............ 244/54 |
| 2011/0127371 A1 * | | 6/2011 | Takeuchi ............... 244/54 |
| 2011/0192933 A1 * | | 8/2011 | Guering et al. ............ 244/54 |
| 2011/0259996 A1 * | | 10/2011 | Vetters et al. ............... 244/54 |
| 2012/0104162 A1 * | | 5/2012 | West ............... 244/54 |
| 2012/0211597 A1 * | | 8/2012 | Bonnet ............... 244/54 |
| 2012/0324907 A1 * | | 12/2012 | Waldron et al. ............ 60/797 |
| 2013/0193298 A1 * | | 8/2013 | Sandy et al. ............... 248/554 |
| 2013/0240666 A1 * | | 9/2013 | Schnelz ............... 244/54 |

* cited by examiner

*Primary Examiner* — Medhat Badawi
(74) *Attorney, Agent, or Firm* — Hanley, Flight & Zimmerman, LLC

(57) ABSTRACT

Methods and apparatus for supporting engines and nacelles relative to aircraft wings are disclosed. An example apparatus includes a first support structure to be coupled to a wing, a second support structure to be coupled to the wing and a nacelle. The support structures are coupled to opposite sides of the nacelle. The support structures are to be coupled to opposite sides of an engine to enable thrust loads to be reacted through the support structures to the wing.

23 Claims, 14 Drawing Sheets

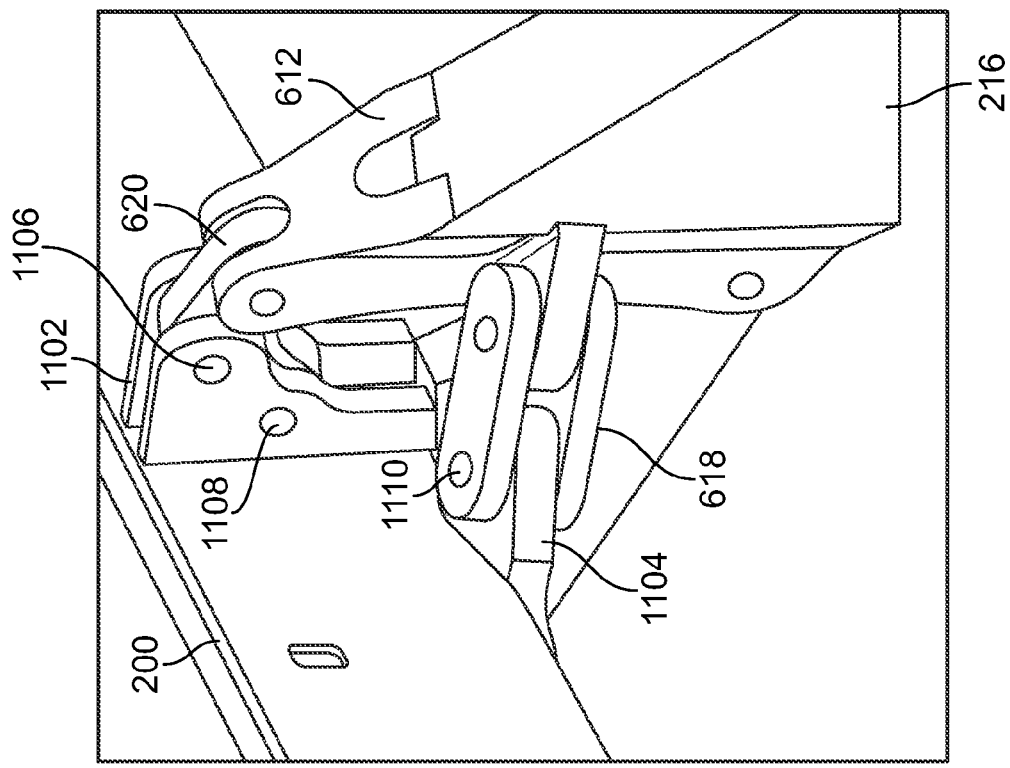
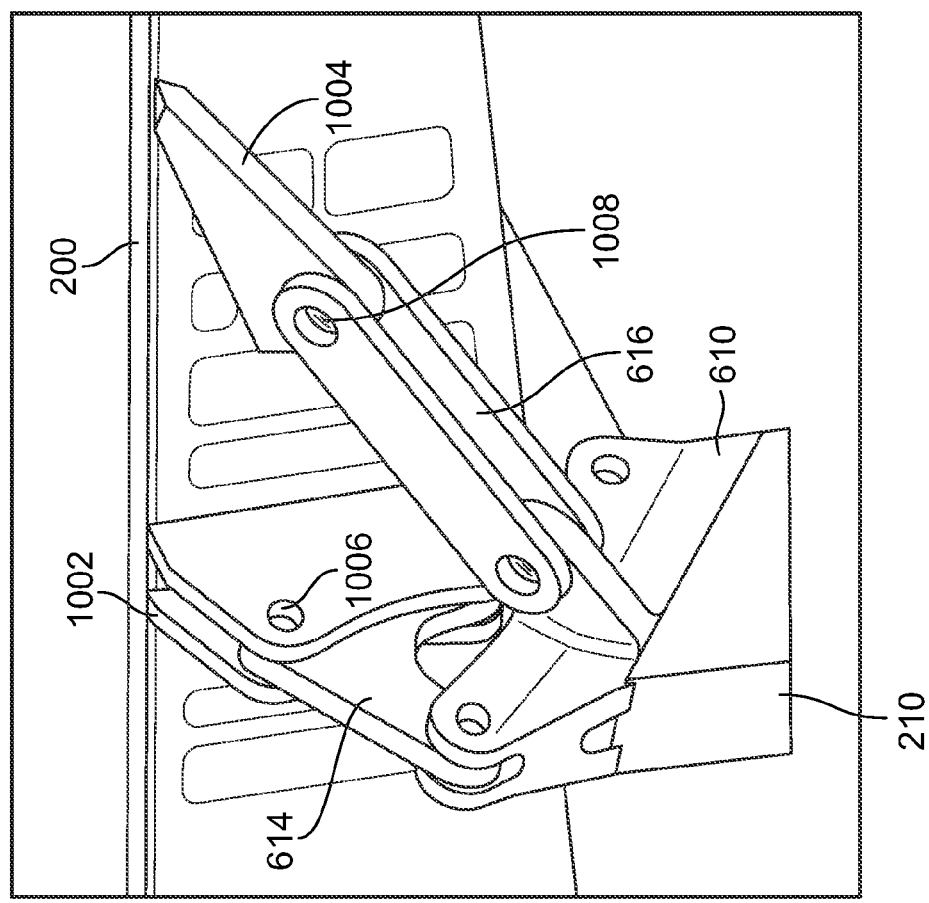
FIG. 11
FIG. 10

METHODS AND APPARATUS FOR SUPPORTING ENGINES AND NACELLES RELATIVE TO AIRCRAFT WINGS

FIELD OF THE DISCLOSURE

This patent relates to supporting engines and nacelles relative to aircraft wings.

BACKGROUND

Airplane engines may be suspended from a wing by a pylon or strut via engine mounts. Different features of these engine mounts may be used to react forward thrust loads, engine twist and/or windup loads, aircraft maneuvering loads and/or aerodynamic loads due to engine rotation and/or other sources.

SUMMARY

An example apparatus in accordance with the teachings of this disclosure includes a first support structure to be coupled to a wing, a second support structure to be coupled to the wing and a nacelle. The support structures are coupled to opposite sides of the nacelle. The support structures are to be coupled to opposite sides of an engine to enable thrust loads to be reacted through the support structures to the wing.

Another example apparatus in accordance with the teachings of this disclosure includes a first support structure to be coupled to a wing and a second support structure to be coupled to the wing. The first support structure is to be coupled on a first side of an engine and the second support structure is to be coupled on a second side of the engine.

A method to enhance support of an engine includes attaching a first beam to a first side of the engine and attaching a second beam to a second side of the engine.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 10 and 11 depict detailed views of couplings between the support structure and a wing.

DETAILED DESCRIPTION

Figure 1:
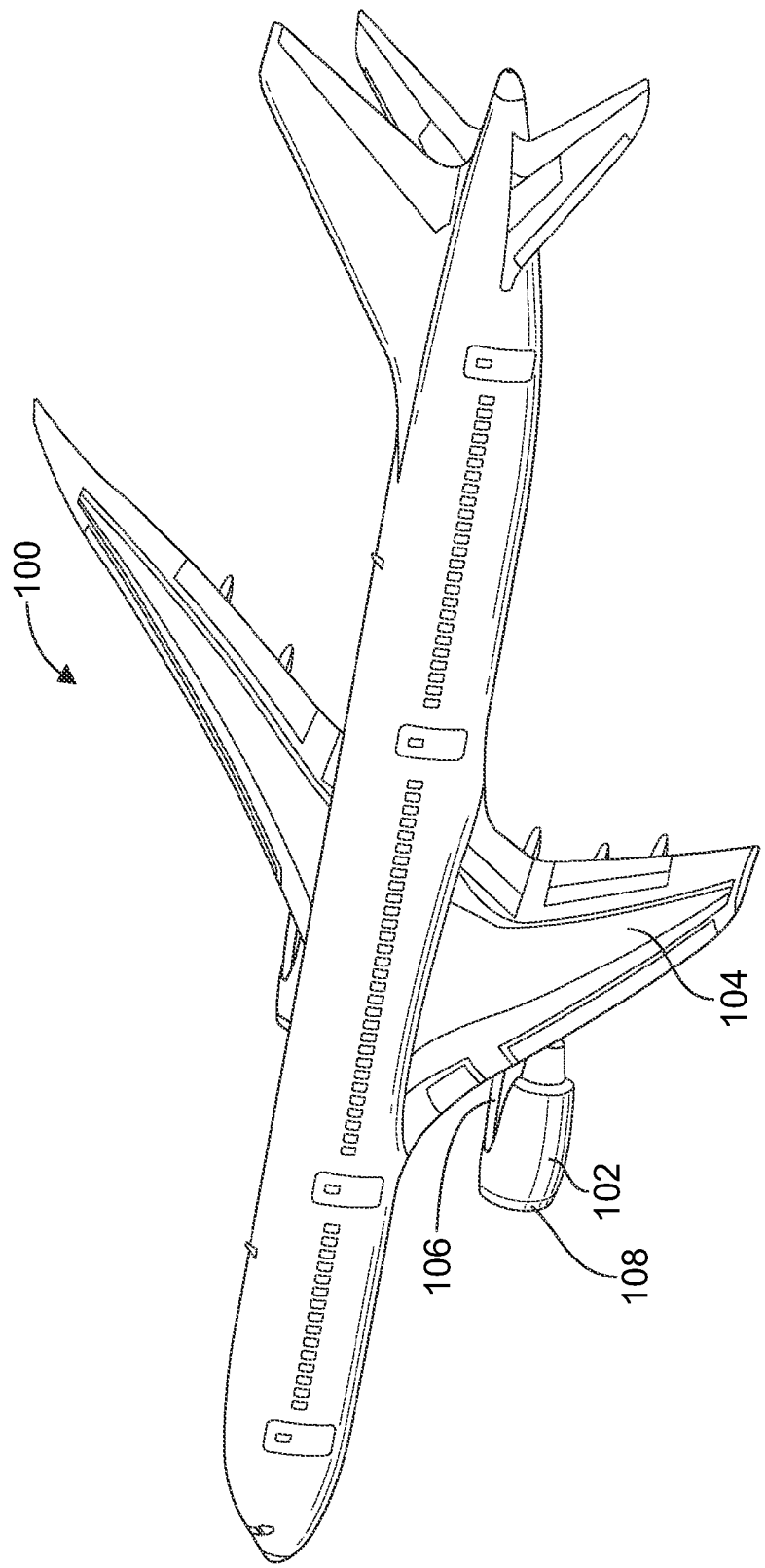
FIG. 1 depicts an aircraft on which the examples disclosed herein may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to engine supports and/or thrust beams for all engine-wing orientations that reduce engine bending due to gravity, thrust loads an/or maneuver loads. The engine-wing orientations include engine below, above, in-line, aft above, aft below, aft inline, imbedded in the wing or fuselage, etc. In some examples, the thrust beams include a first support and/or engine thrust reaction point and a second support and/or engine thrust reaction point. The first support/reaction point is positioned on an inboard side of the engine and the second support/reaction point is positioned on an outboard side of the engine. The reaction points may be substantially diametrically opposed along the engine case (e.g., fan mount and/or core mount) to reduce and/or eliminate engine bending and associated engine blow-by, thereby improving engine specific fuel consumption (SFC). In other examples, the supports and/or the reaction points are positioned below the centerline of the engine to enable forces such as an engine inlet upload force at take-off to counteract (e.g., cancel out) an eccentric engine thrust force.

By removing the center top pylon used in some engine mounting arrangements, the area above the engine may be used for cascades that enable reverser thrust to be blown upwards in addition to and/or instead of being blown downward and to the sides. Blowing the reverser thrust upwards increases aircraft brake effectiveness. Additionally or alternatively, by using two thrust beams instead of a single center top pylon, internal space in one of the thrust beams may be used to convey flammable fluids (e.g., fuel, hydraulics) and the internal space of the other thrust beam may be used for ignition sources (e.g., electrical wiring, pneumatic air). Thus, flammable fluids and ignition sources are not positioned in the same pylon.

In practice, opposite sides of a nacelle structure may be attached to the thrust beams to enable loads to be reacted therethrough. The loads may include loads not in the fore-aft direction such as vertical and/or lateral bending loads. The nacelle structure may be hard mounted and/or hinged for engine access. By using the nacelle to react some loads, less structure is needed to react the forces, thereby reducing the weight of the support structure. Additionally or alternatively, because two opposed thrust beams may be used, the nacelle structure and/or the thrust reverser mechanisms may be better supported and/or may experience reduced structural deformations.

FIG. 1 depicts an airplane 100 including engines 102 coupled to wings 104. The airplane 100 includes centrally located pylons 106 that receive thrust loads from the engines and nacelle 102. Having the thrust loads received from above a centerline of the engine 102 creates a moment that drives a forward part and/or inlet 108 of the engine 102 upward, reacts an aft engine mount and bends the engine case. Such bending is increased during high thrust situations and/or during take-off when an angle of incidence relative to the inlet is greater. Additionally, such bending may cause rotating apparatus of the engine 102 to engage and wear sacrificial material within the engine case.

However, during low power flight conditions such as during cruise, there is less engine case bending and a greater gap between the engine case and the rotating apparatus. The gap between the engine case and the rotating apparatus causes blow-by and reduces engine performance such as more fuel burned for a given thrust setting. The rotating apparatus may include a fan, a compressor and/or turbine section including blades that push or are pulled by air traveling through the engine 102.

Figure 2:
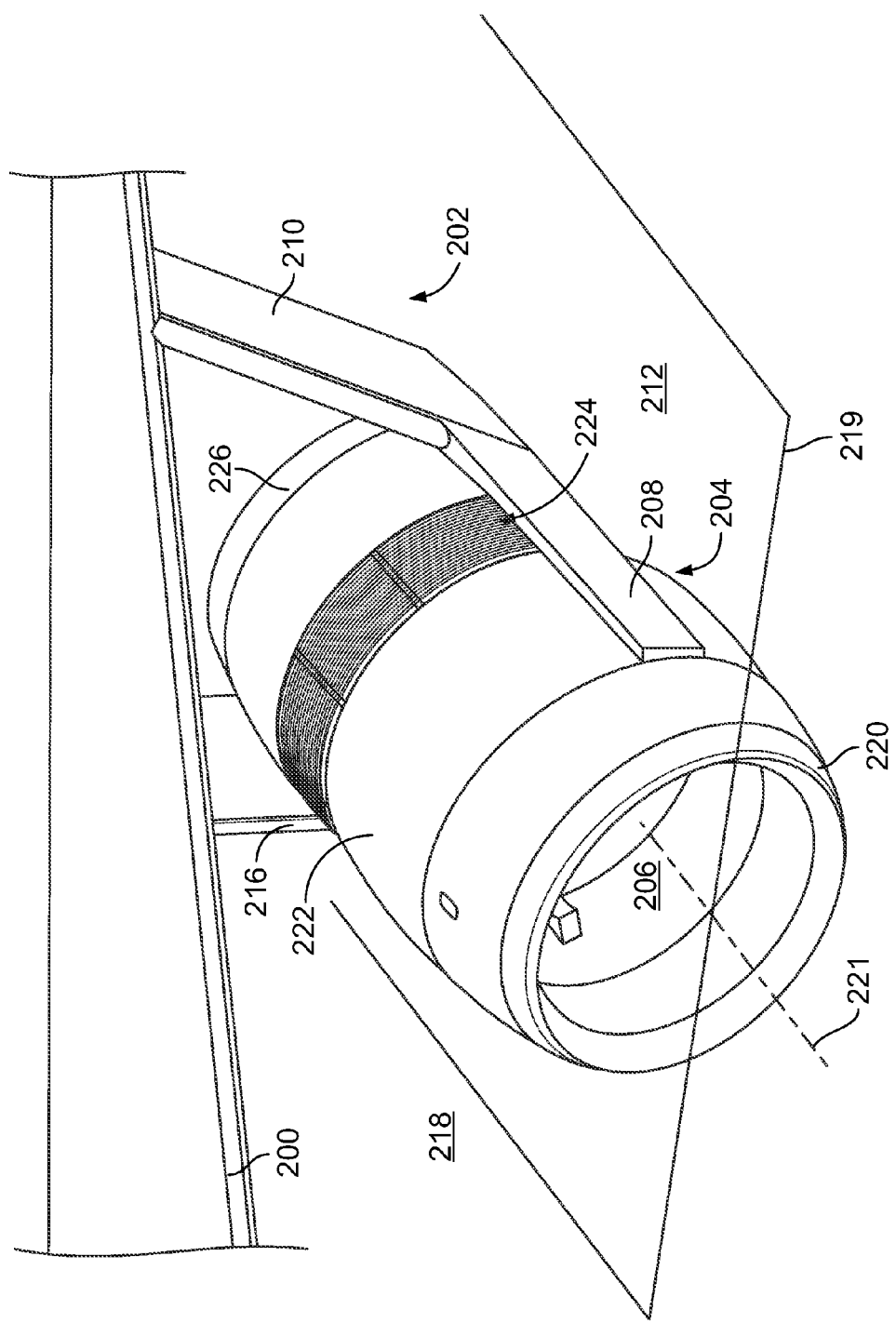
FIG. 2 depicts an example engine and nacelle coupled to a wing using an example support structure with a thrust reverser in an extended position.
Figure 3:
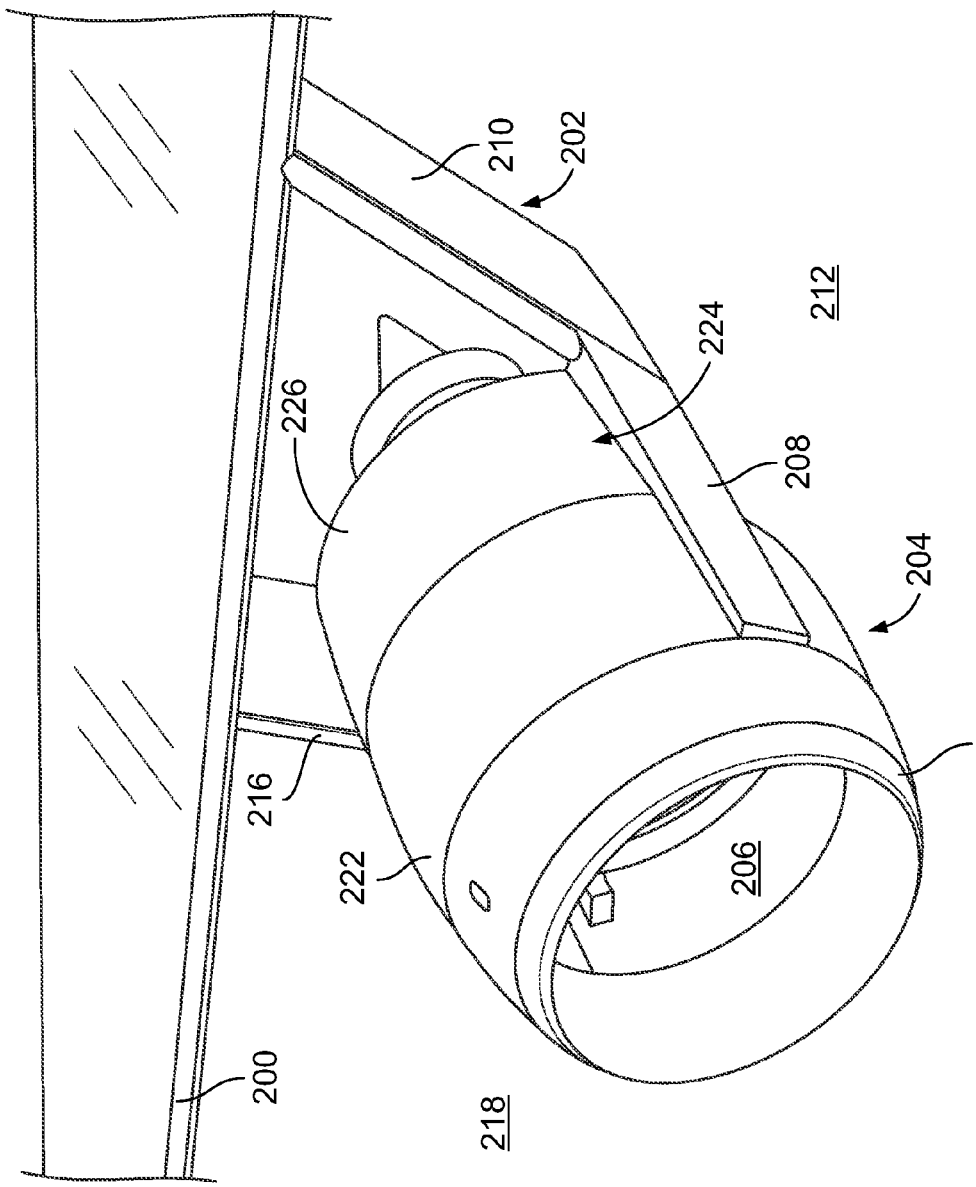
FIG. 3 depicts an example engine and nacelle coupled to a wing using an example support structure with a thrust reverser in a stowed position.

FIGS. 2 and 3 depict an example wing 200, support structure 202, a nacelle 204 and an engine 206 in accordance with the examples disclosed herein. The support structure 202 includes a first support and/or thrust beam 208 and a first pylon stub and/or portion 210 and a second support and/or thrust beam 500 (FIG. 5) and a second pylon stub and/or portion 216. The first thrust beam 208 and the first pylon stub 210 are positioned on a first and/or outboard side 212 of the engine 206 and the second thrust beam 500 and the second pylon stub 216 are positioned on a second and/or inboard side 218 of the engine 206. The thrust beams 208, 500 may be centrally positioned relative to a longitudinal plane 219 of the engine 206 to enable thrust loads to be reacted through and/or carried straight back to the wing 200 along and/or substantially parallel to the longitudinal plane 219. In some examples, the longitudinal plane 219 is positioned along and/or adjacent a thrust axis and/or a centerline 221 of the engine.

Figure 4:
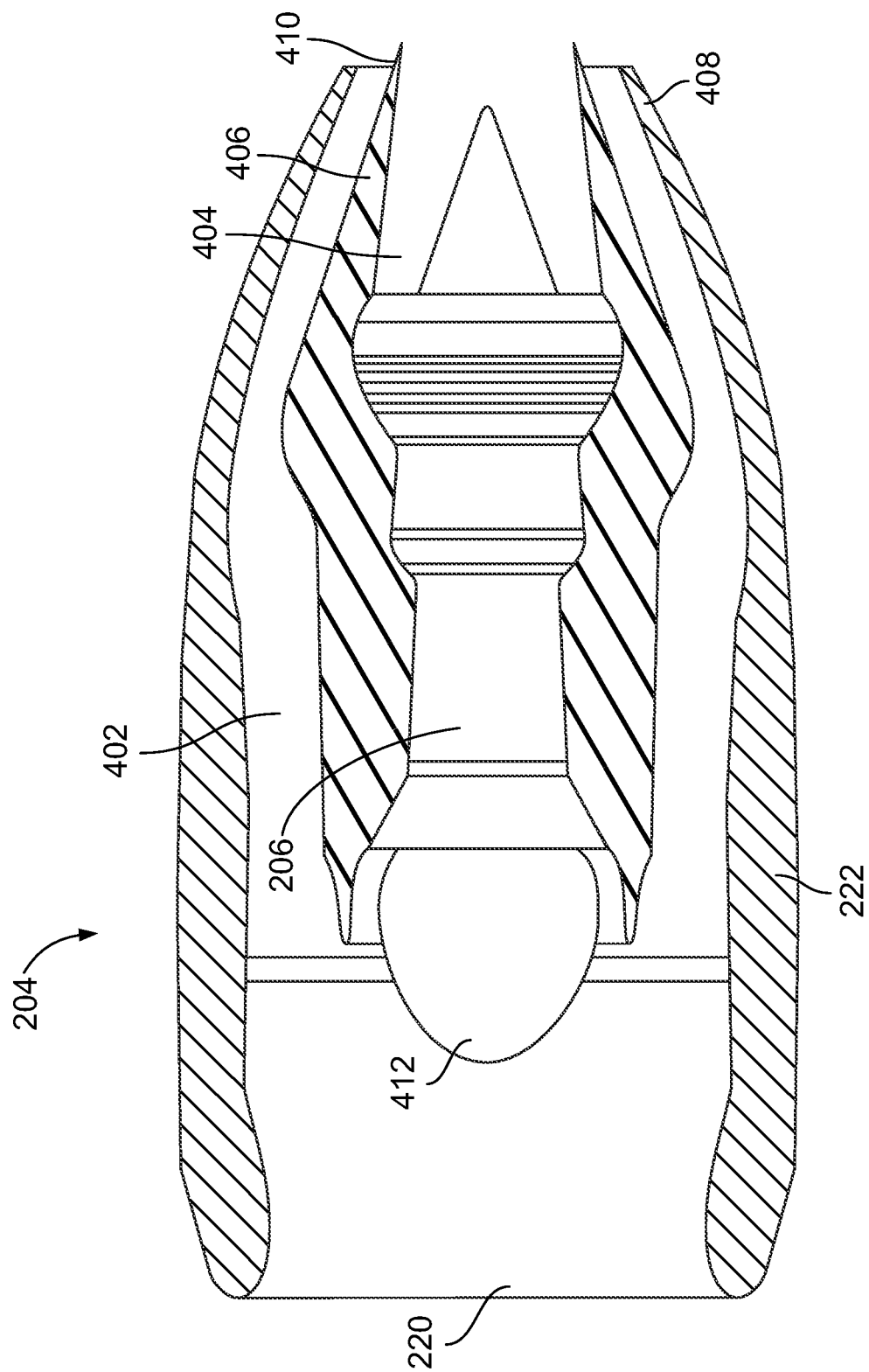
FIG. 4 depicts a cross-sectional view of an example engine and nacelle in accordance with the teachings of this disclosure.

Referring to FIGS. 2-4, in some examples, the nacelle 204 includes an inlet 220, a fan duct 402 (FIG. 4), a core duct 404 (FIG. 4), a fan cowling 222, a core cowling 406 (FIG. 4), a fan nozzle 408 (FIG. 4), a core nozzle 410 (FIG. 4), a fan 412 (FIG. 4) and/or thrust reversers 224. A thrust reverser cover 226 of the thrust reversers 224 is moveable between an extended position (shown in FIG. 2) and a stowed position (shown in FIG. 3).

Figure 5:
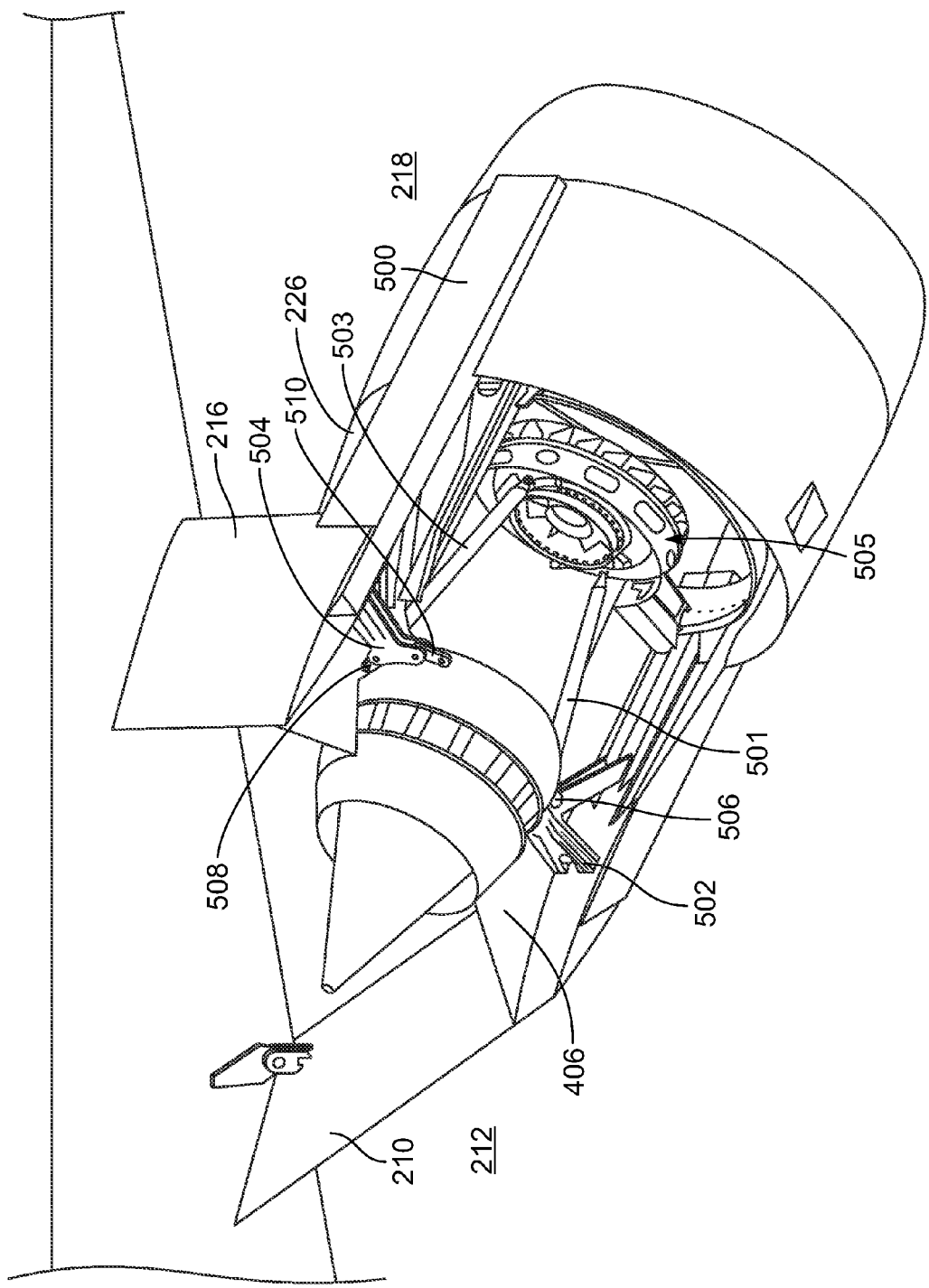
FIG. 5 depicts an example engine and a nacelle portion coupled to a wing using an example support structure in accordance with the teachings of this disclosure.
Figure 6:
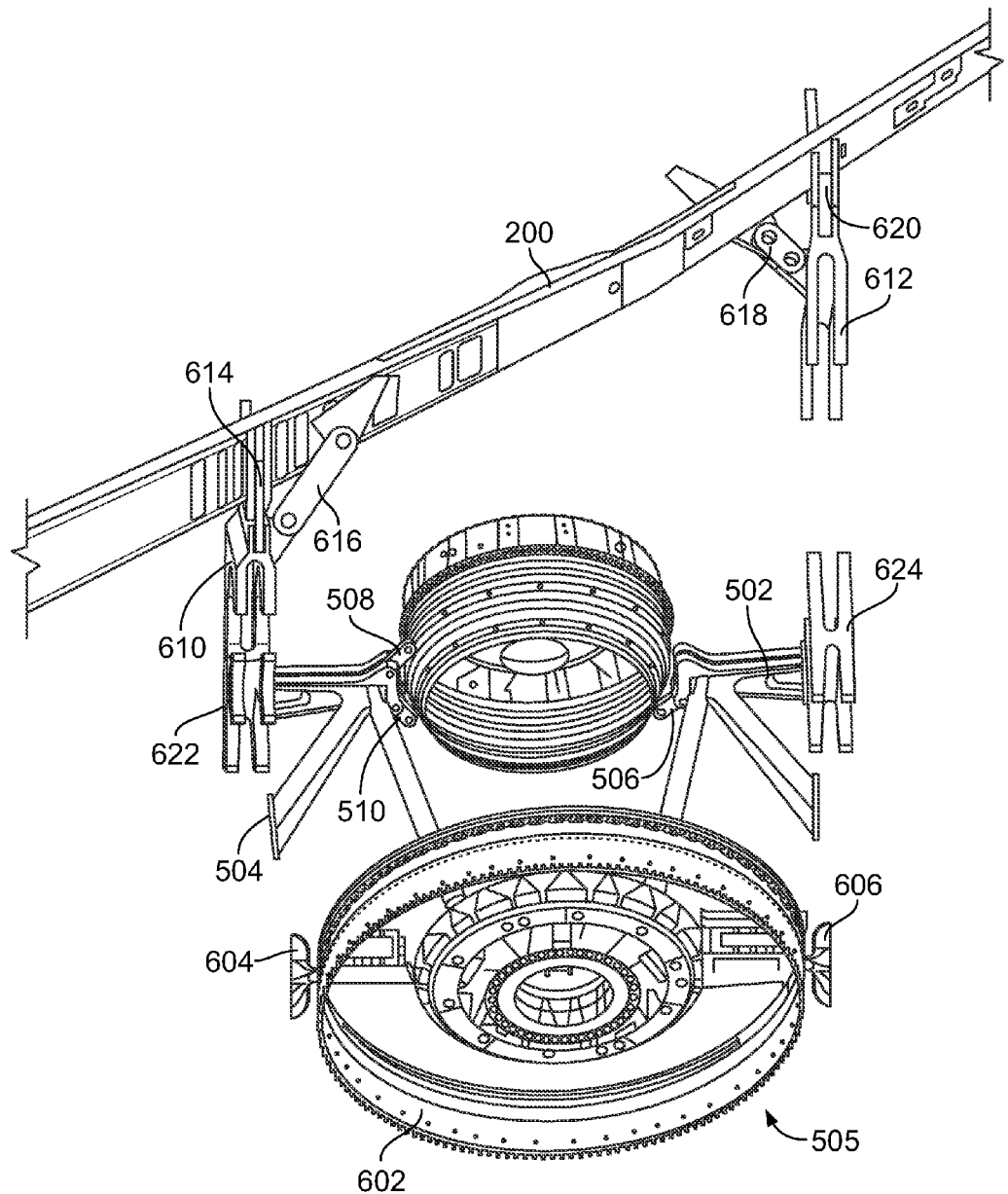
FIG. 6 depicts portions of a fan assembly and engine and an example support structure in accordance with the teachings of this disclosure.

As shown in FIGS. 5 and 6, to couple the engine 206 and the thrust beams 208, 500, the thrust beams 208, 500 include respective first and second aft mount fittings and/or brackets 502, 504. In some examples, to transfer thrust and/or a load to the aft mount fittings 502, 504 and, in turn, the thrust beams 208, 500, thrust links 501, 503 are coupled between the aft mount fittings 502, 504 and a fan assembly 505. While the thrust links 501, 503 are depicted as having a particular length and/or size and coupled to the aft mount fittings 502, 504 and/or the fan assembly 505 at particular locations, the thrust links 501, 503 may be a different length (e.g., longer, shorter) and may be differently positioned. In other examples, the thrust links 501, 503 are attached directly to the thrust beams 208, 500. In other examples, the thrust loads may be reacted by front and/or fan case mounts discussed in connection with FIG. 6 without use of the thrust links 501, 503. In other examples, the thrust links 501, 503 may be eliminated or augmented by reacting the thrust and/or other fore-aft loads through front and/or fan case mounts discussed in connection with FIG. 6.

To substantially improve the reactions for engine windup during operation, a first aft engine mount link 506 is coupled between the engine 206 and the first aft mount fitting 502 and second and third aft engine mount links 508, 510 are coupled between the engine 206 and the second aft mount fitting 504. In other examples, instead of using three aft engine mount links, a different number of aft mount engine links may be used (e.g., 2, 4).

To couple a fan case 602 and/or the fan assembly 505 to the thrust beams 208, 500, a first fan case mount 604 (FIG. 6) is coupled and/or pivotably mounted to the fan case 602 (FIG. 6) and a second fan case mount 606 (FIG. 6) is coupled and/or pivotably mounted to the fan case 602 (FIG. 6). In some examples, the interface between the fan case 604, the fan assembly 505 and/or the thrust beams 208, 500 is designed to take up vertical and lateral loads but not thrust loads. In some such examples, the thrust loads are taken up by the thrust links 501, 503. In other examples, the interface between the fan case 604, the fan assembly 505 and/or the thrust beams 208, 500 is designed to take up the thrust loads and/or other fore-aft loads. In some such examples, the thrust links 501, 503 may not be included. In other examples, the fore-aft loads may be taken up at the front mount interface (e.g., the fan case mounts 604, 606) and/or the thrust links 501, 503.

In some examples, as shown in FIG. 6, brackets and/or fittings 610, 612 may be used to couple the pylon stubs 210, 216 to the wing 200 via links 614-620. Additionally, in some examples, brackets and/or fittings 622, 624 may be used to couple the struts and/or pylons 210, 216 to the thrust beams 208, 500. While not shown, in other examples, the fittings 610, 612, 622 and 624 are integral to the pylons 210, 216 and/or the thrust beams 208, 500.

Figure 7:
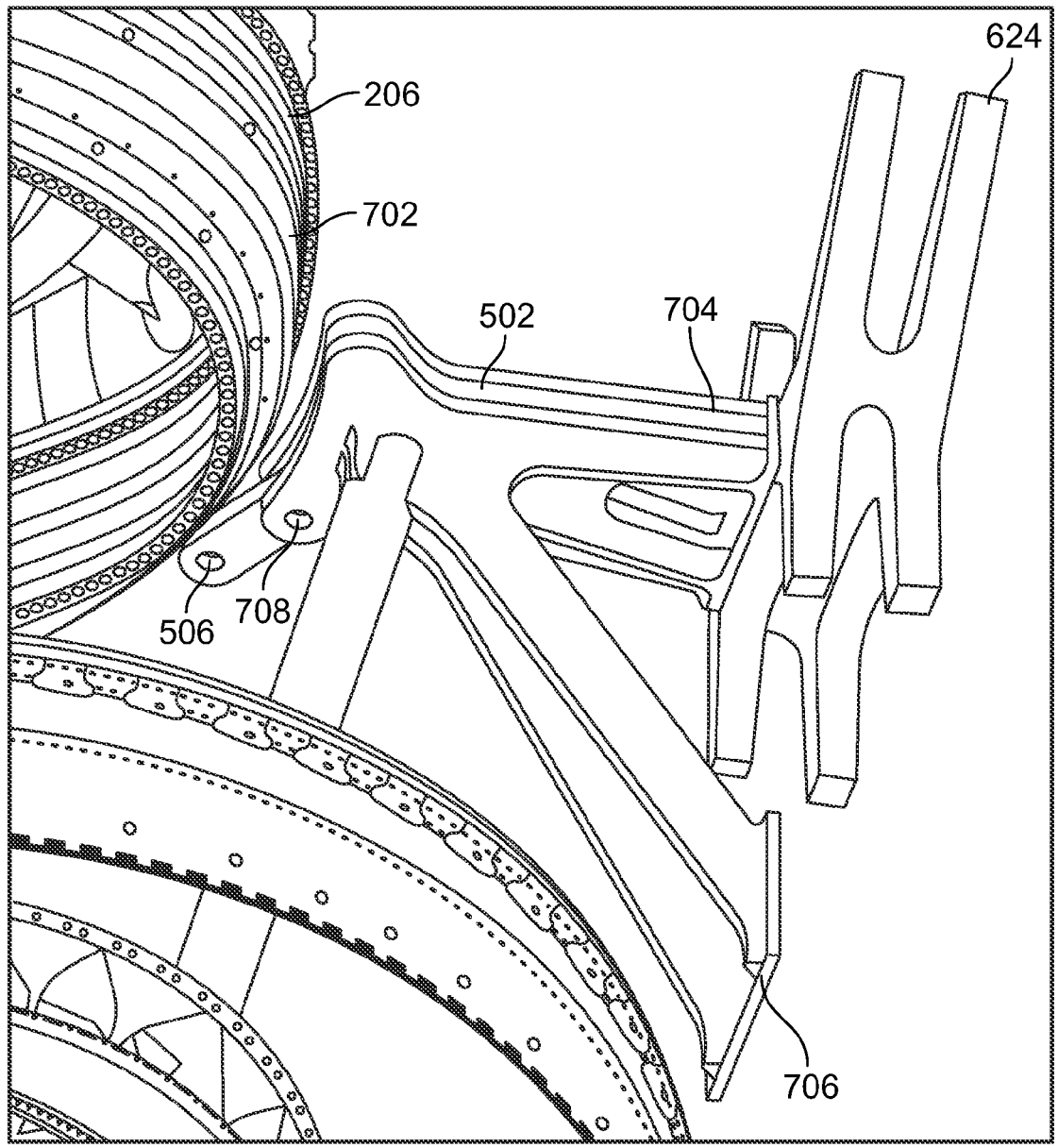
FIGS. 7 and 8 depict detailed views of aft couplings between the example support structure and the engine.

FIG. 7 depicts a detailed view of the bracket 624, the first aft mount fitting 502, the first engine mount link 506 and the engine 206 and/or engine core case 702. In this example, the first aft mount fitting 502 includes a first portion and/or leg 704 coupled to the bracket 624 and a second portion and/or leg 706 to be coupled to the first support beam 208. The legs 704, 706 converge and/or are coupled together and define an aperture 708 to enable the first engine mount link 506 to be coupled and/or pivotably coupled to the first aft mount fitting 502.

Figure 8:
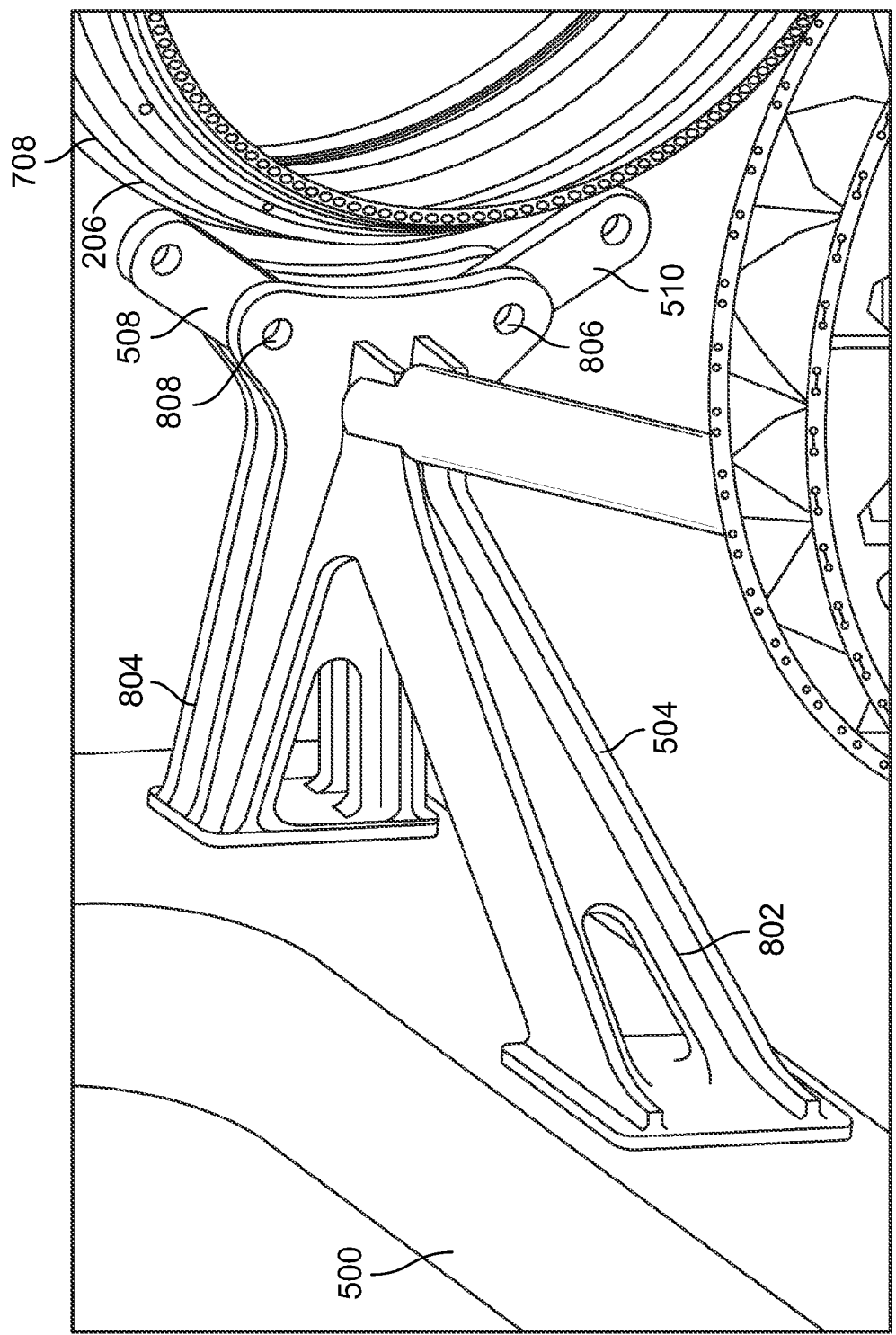

FIG. 8 depicts a detailed view of the second thrust beam 500, the second aft mount fitting 504, the aft engine mount links 508, 510 and the engine 206 and/or the engine core case 702. In this example, the second aft mount fitting 504 includes first and second portions and/or legs 802, 804 coupled to the second thrust beam 500. The legs 802, 804 converge and/or are coupled together and define apertures 806, 808 to enable the aft engine mount links 508, 510 to be coupled and/or pivotably coupled to the first aft mount fitting 502.

Figure 9:
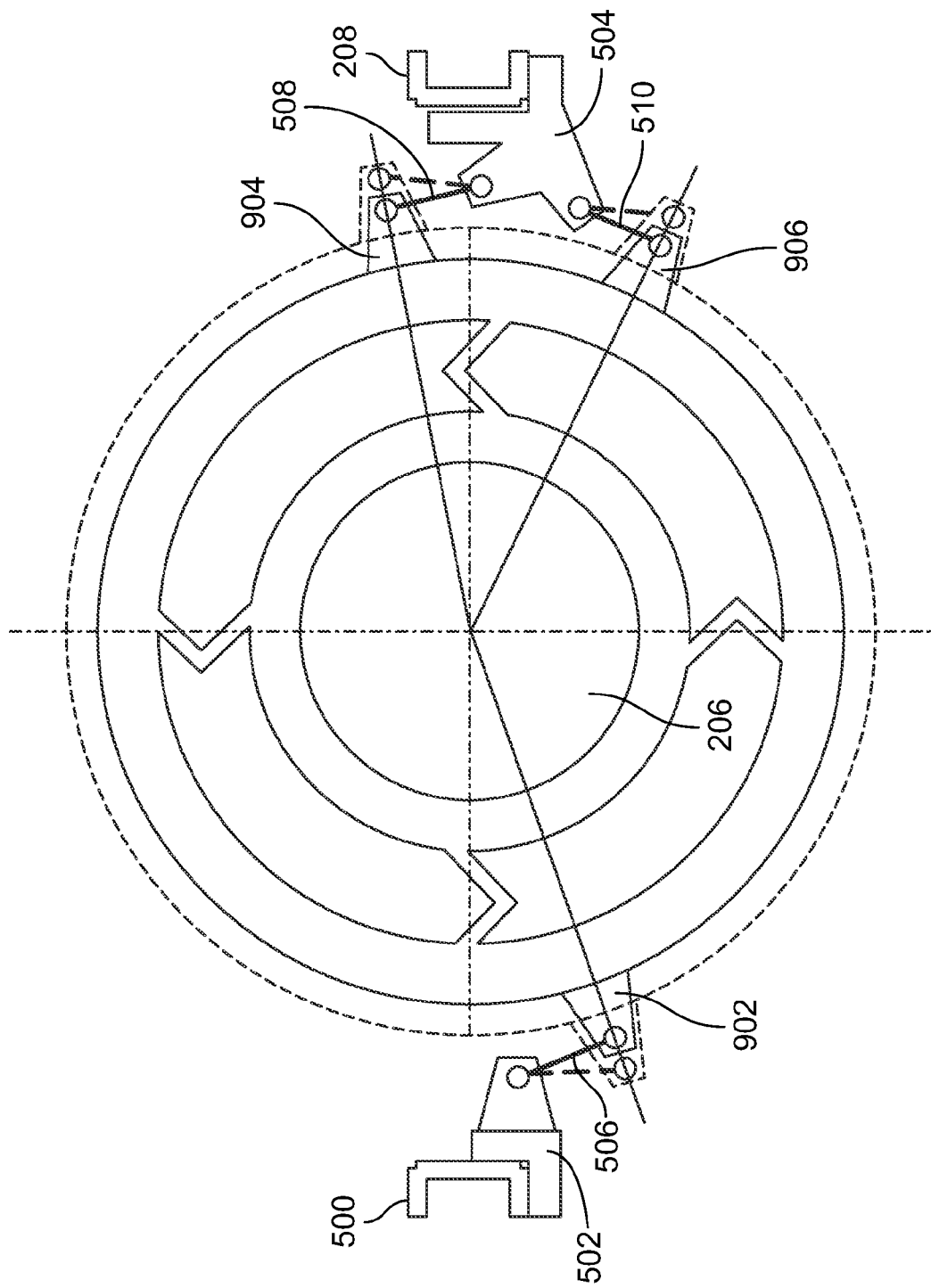
FIG. 9 depicts a cross-sectional view of the coupling between an example support structure and an engine.

FIG. 9 depicts the coupling between the aft engine mount links 506-510 and engine clevises 902-906. The positioning of the aft engine mount links 506-510 relative to the engine 206 is substantially more efficient at reacting core wind-up forces without substantial lateral movement of the engine that results from suspending the engine from the top of the case 206. Additionally, the disclosed examples, better reacts lateral maneuvering-induced engine loads as compared to some known approaches. In some examples, to enable a centerline of the engine 206 to remain relatively stable, the aft engine mount links 506-510 are adjusted, have thermal expansion characteristics and/or are configured to accommodate growth of the engine case diameter, growth of the engine 206 diameter and/or growth of the aft engine mount links 506-510. Specifically, the thermal expansion rates of the aft engine mount links 506-510 may match and/or correspond to the thermal expansion rates of the engine case and clevises 902-906.

FIG. 10 depicts a detailed view of the coupling between the first pylon stub 210 and the wing 200 (e.g., right mount). In this example, the wing 200 includes clevises 1002, 1004 defining apertures 1006, 1008 to enable the links 614, 616 to be coupled and/or pivotably coupled thereto.

FIG. 11 depicts a detailed view of the coupling between the second pylon stub 216 and the wing 200 (e.g., left mount). In this example, the wing 200 includes clevises 1102, 1104 defining apertures 1106-1110 to enable the links 618, 620 to be coupled and/or pivotably coupled thereto.

Figure 12:
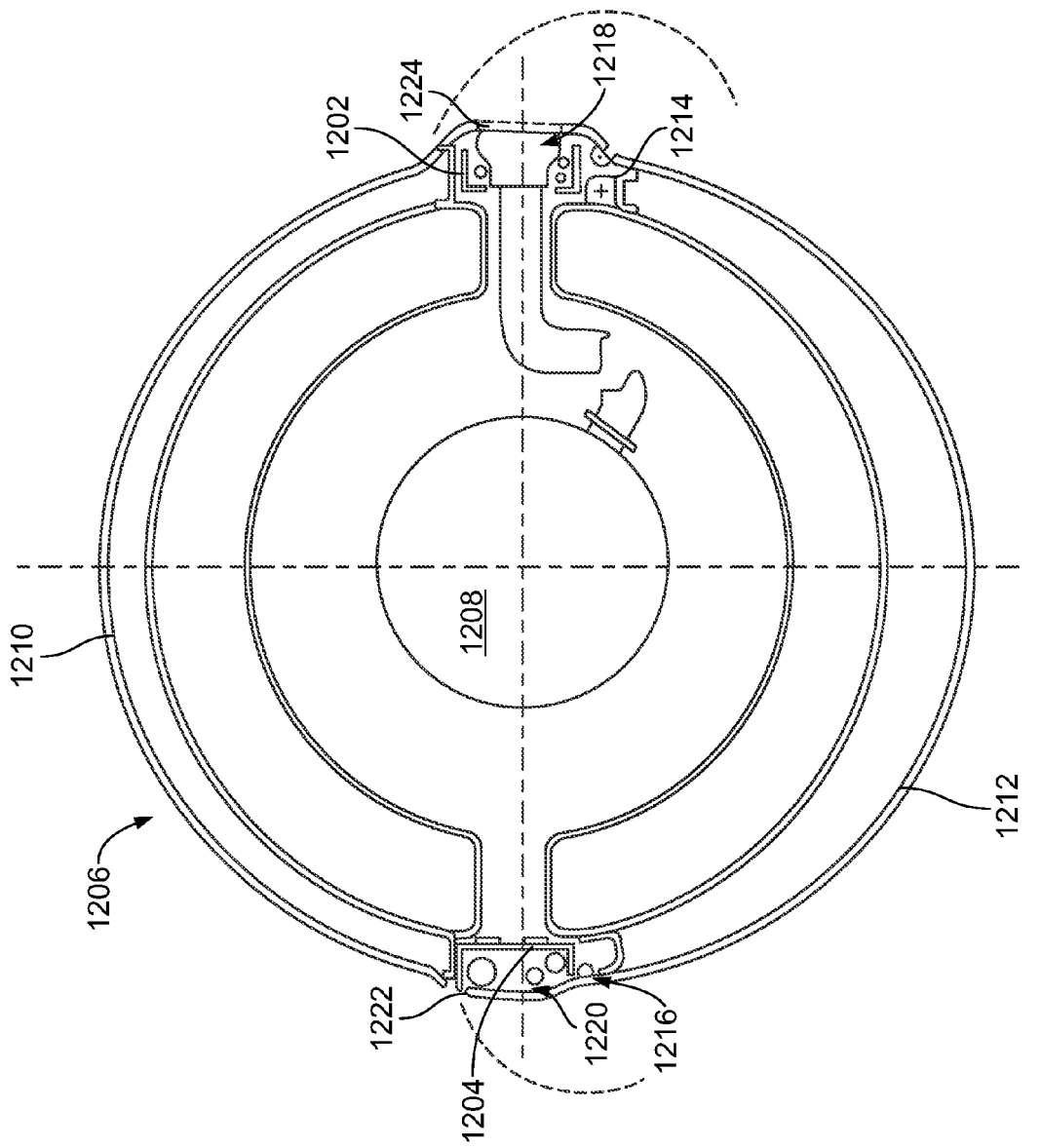
FIG. 12 depicts a cross-sectional view of an example engine and nacelle coupled to an example support structure in accordance with the teachings of this disclosure.

FIG. 12 depicts a cross-sectional view of example thrust beams 1202, 1204, an example nacelle 1206 and an engine 1208. In this example, the nacelle 1206 includes an upper portion 1210 and a lower portion 1212. The upper portion 1210 may be coupled and/or hard mounted (e.g., bolts, fasteners, shear pins) to the thrust beams 1202, 1204 and the lower portion 1212 may be rotatably coupled to the first thrust beam 1202 via hinges 1214 to enable access to the engine 1208. To secure the lower portion 1212 relative to the thrust beams 1202, 1204 in the closed position, latches 1216 may be coupled to the second thrust beam 1204 and/or the lower portion 1212.

In some examples, because two thrust beams 1202, 1204 are used to couple the engine 1208 and/or the nacelle 1206 to a wing instead of a single center top pylon, ignition sources 1218 may be positioned in and/or routed through the first thrust beam 1202 and fuel sources 1220 may be positioned in and/or routed through the second thrust beam 1204. The ignition sources 1218 may include environment control systems (ECS), electrical wiring, pneumatic air, etc. and the fuel sources 1220 may include fuel, hydraulics, etc. Thus, the fuel sources 1220, which may be flammable, are separate from and positioned in a different thrust bream than the ignition sources 1218. To enable access to the respective sources 1218, 1220, access panels 1222, 1224 are coupled between the upper and lower portions 1210, 1212 of the nacelle 1206. While not shown, in other examples the upper portion 1210 is hinged and latched. In some examples, the engine nacelle 1206 and/or the engine fan case can be rotated 90 degrees so that bifurcations are on the left/right rather than top/down.

Figure 13:
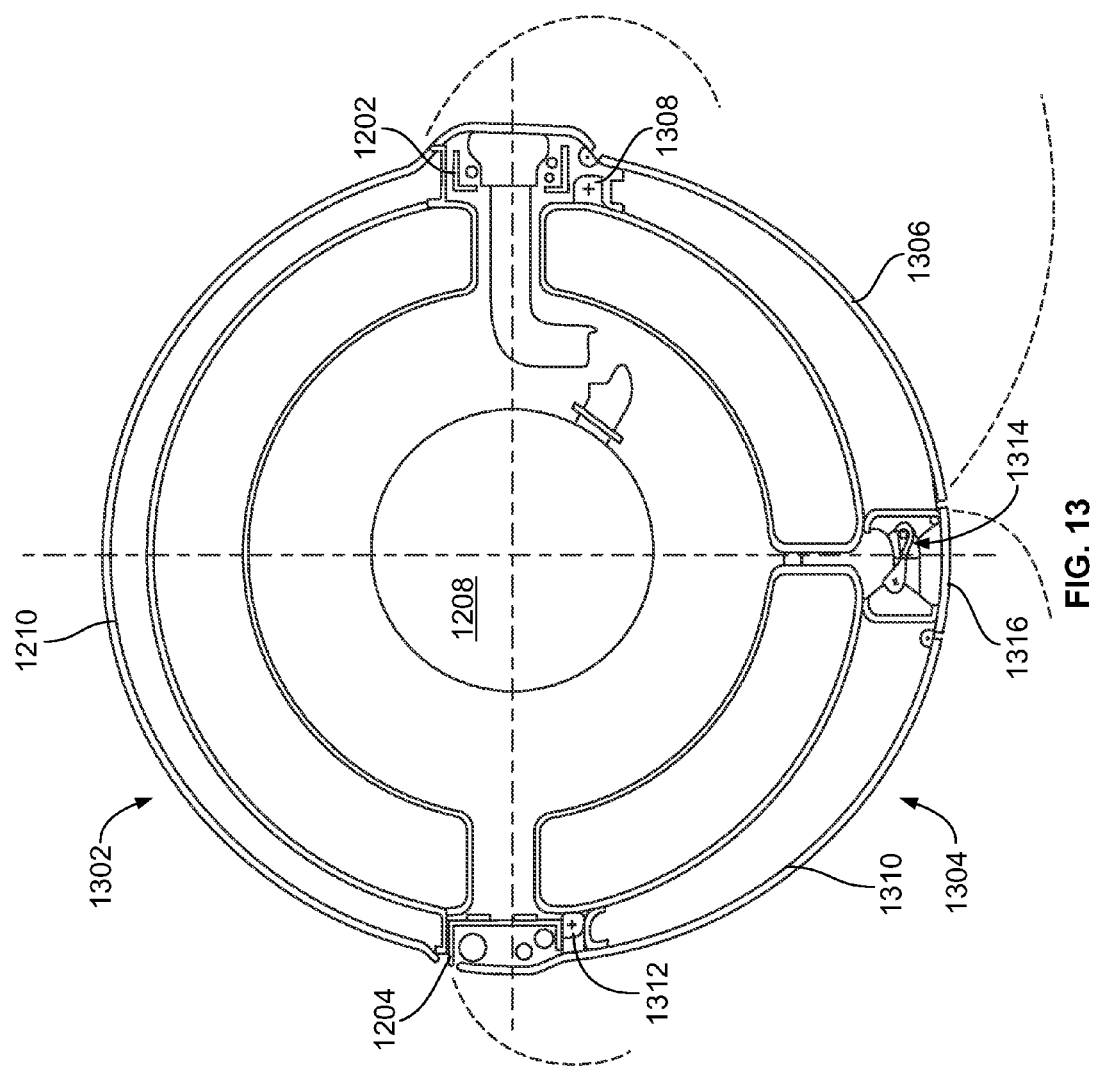
FIG. 13 depicts a cross-sectional view of an example engine and nacelle coupled to an example support structure in accordance with the teachings of this disclosure.

FIG. 13 depicts a cross-sectional view of example thrust beams 1202, 1204, an example nacelle 1302 and the engine 1208. In contrast to the nacelle 1206 of FIG. 12, the nacelle 1302 of FIG. 13 includes a lower portion 1304 that can be opened with less ground clearance. The lower portion 1304 includes a first hinged portion 1306 rotatably coupled to the first thrust beam 1202 via first hinges 1308 and a second hinged portion 1310 rotatably coupled to the second thrust bream 1204 via second hinges 1312. A latch 1314 may be used to couple the hinged portions 1306 and 1310 together in the closed position. In some examples, to provide access to the latch 1314, a pivotable panel 1316 is positioned between the first and second hinged portions 1306, 1310. In other examples, the upper portion 1210 is hinged and latched for additional engine access or other reasons. In some examples, the engine nacelle 1302 and/or the engine fan case can be rotated 90 degrees so that bifurcations are on the left/right rather than top/down.

Figure 14:
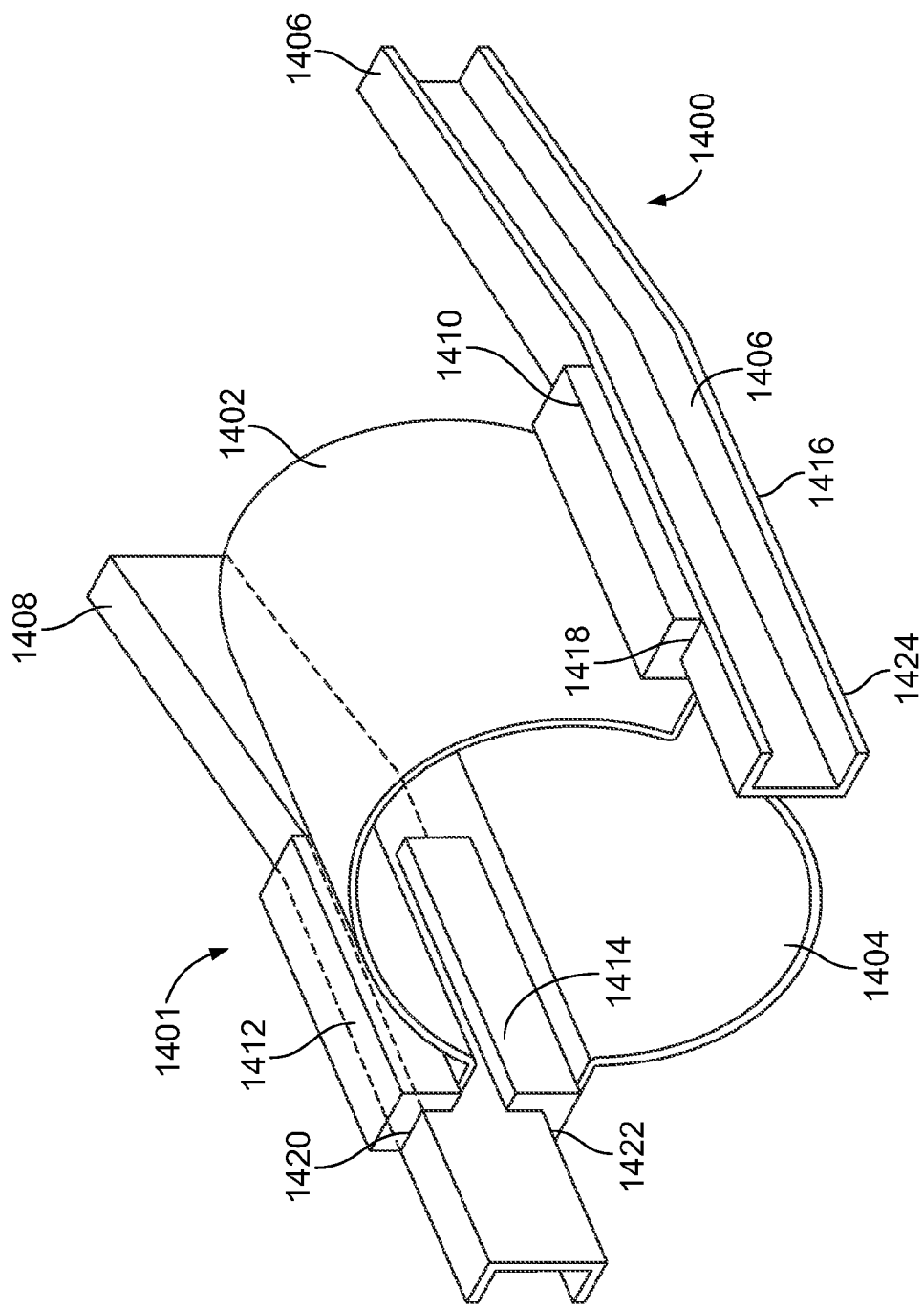
FIG. 14 depicts an example nacelle coupled to an example support structure in accordance with the teachings of this disclosure.

FIG. 14 depicts an example support structure 1400 and a nacelle 1401 that disperses conventional pylons loads. As shown in FIG. 14, upper and lower fan ducts 1402, 1404 of the nacelle 1401 are coupled to first and second thrust beams 1406, 1408. In some examples, the upper fan duct 1402 is fixed and/or bolted relative to the thrust beams 1406, 1408 and the lower fan duct 1404 is hingably coupled to the thrust beams 1406, 1408. To enable the fan ducts 1402, 1404 to be easily coupled to the thrust beams 1406, 1408, sides 1410-1416 of the fan ducts 1402, 1404 define grooves 1418-1424 that receive the thrust beams 1406, 1408.

Figure 15:
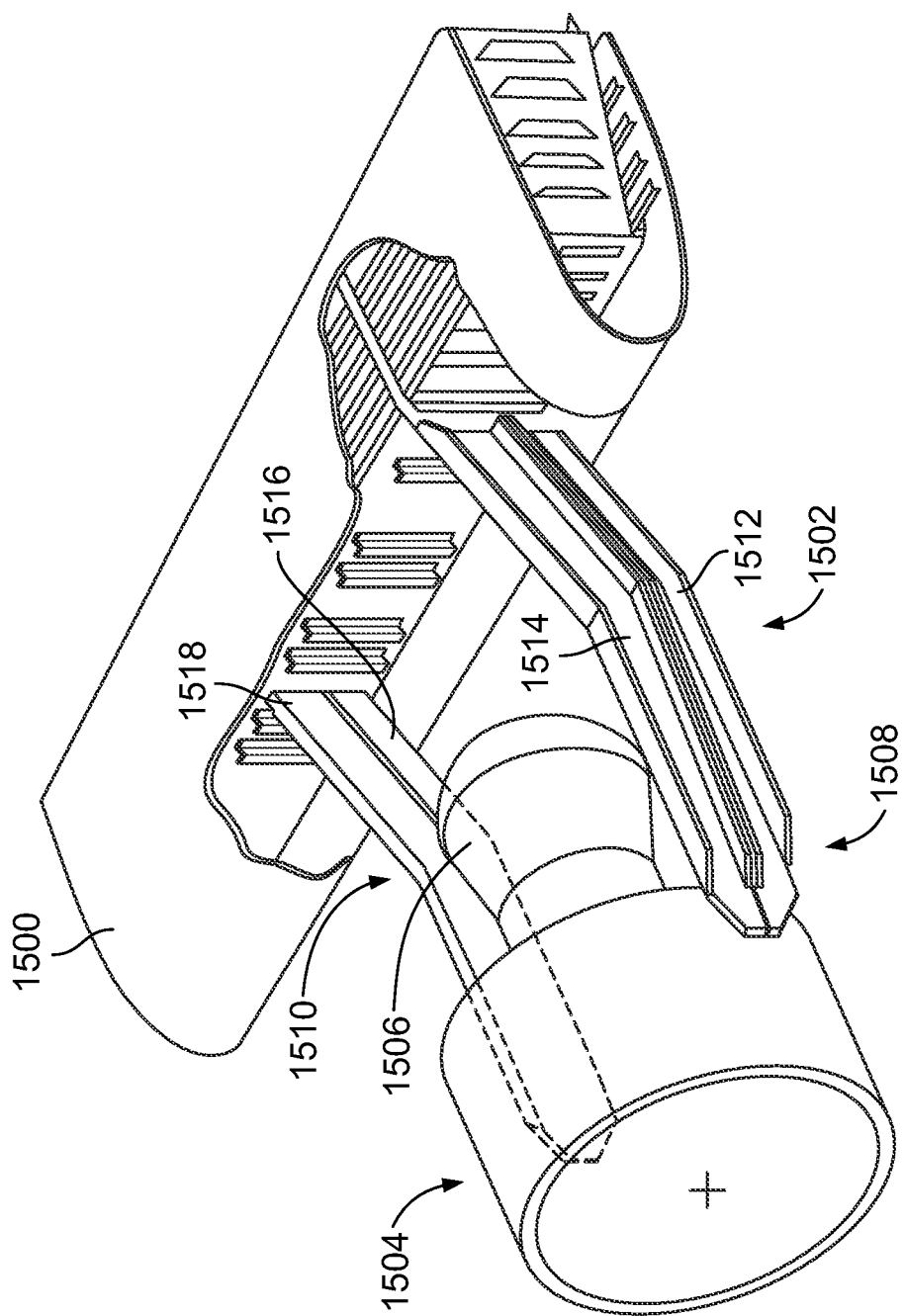
FIG. 15 depicts an example nacelle coupled to another example support structure in accordance with the teachings of this disclosure.

FIG. 15 depicts an example wing 1500, support structure 1502, a nacelle 1504 and an engine 1506 in accordance with the examples disclosed herein. In contrast to the examples disclosed above, the example support structure 1502 includes a first and/or split thrust beam 1508 and a second and/or split thrust beam 1510. The first thrust beam 1508 includes first and second thrust beam portions 1512, 1514 coupled to the nacelle 1504 and/or the engine 1506 and the second thrust beam 1510 includes third and fourth thrust beam portions 1516, 1518 coupled to the nacelle 1504 and/or the engine 1506. Such an approach of using the thrust beam portions 1512-1518 breaks, separates and/or isolates the thrust load paths and enables a failure to occur without the physical loss of the engine 1506.

As set forth herein, an example apparatus includes a first support structure to be coupled to a wing, a second support structure to be coupled to the wing and a nacelle. The support structures are coupled to opposite sides of the nacelle. The support structures are to be coupled to opposite sides of an engine to enable thrust loads to be reacted through the support structures to the wing.

In some examples, the first support structure is to be positioned on an inboard side of the engine and the second support structure is to be positioned on an outboard side of the engine. In some examples, portions of the support structures are to be positioned along a longitudinal plane of the engine. In some examples, the first support structure includes a first pylon stub and a first thrust beam, the first pylon stub is to be coupled to the wing and the first thrust beam to be coupled to the engine.

In some examples, the second support structure comprises a second pylon stub and a second thrust beam, the second pylon stub is to be coupled to the wing and the first thrust beam is to be coupled to the engine. In some examples, the first and second thrust beams are to be positioned along a longitudinal plane of the engine. In some examples, the longitudinal plane is to be positioned along or adjacent to a thrust axis of the engine. In some examples, the longitudinal plane is to be positioned along or adjacent a centerline of the engine. In some examples, the longitudinal plane is to be positioned below a centerline of the engine.

In some examples, the example apparatus also includes a first aft mount to be coupled between the first support structure and the engine and a second aft mount to be coupled between the second support structure and the engine. In some examples, the example apparatus also includes a first engine mount link coupled between the first aft mount and the engine and second and third engine mount links coupled between second aft mount and the engine. The aft mount links are to pivotably couple the engine to the first and second aft mounts. In some examples, the example apparatus also includes a first thrust link to be coupled between a fan assembly and the first aft mount or the second aft mount. The first thrust link is to enable a load to to be transferred to the corresponding support structure.

In some examples, the example apparatus also includes a second thrust link to be coupled between the fan assembly and the other of the first aft mount or the second aft mount. The second thrust link is to enable a load to be transferred to the corresponding support structure. In some examples, the example apparatus also includes a first fan case mount to be coupled between the first support structure and a fan assembly and a second fan case mount to be coupled between the second support structure and the fan assembly. In some examples, the example apparatus also includes a fuel source is to be positioned in the first support structure and an ignition source is to be positioned in the second support structure. In some examples, the example apparatus also includes a plurality of links to couple the support structures to the wing. In some examples, the nacelle includes one or more of an inlet, a fan duct, a core duct, a fan cowling, a core cowling, a fan nozzle, a core nozzle, a fan, or a thrust reverser.

In some examples, the apparatus also includes a first thrust link to be coupled in a load bearing relationship between a fan assembly and the first aft mount or the second aft mount. In some examples, the apparatus also includes a second thrust link to be coupled in a load bearing relationship between the fan assembly the other of the first aft mount or the second aft mount.

Another example apparatus includes a first support structure to be coupled to a wing and a second support structure to be coupled to the wing. The first support structure is to be coupled on a first side of an engine and the second support structure is to be coupled on a second side of the engine.

An example method to enhance support of an engine includes attaching a first beam to a first side of the engine and attaching a second beam to a second side of the engine. The method also includes positioning a fuel source in the first beam and positioning an ignition source in the second beam.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
    a nacelle;
    a first support structure coupled at a first position of a wing and at a first side of the nacelle along a longitudinal plane intersecting a thrust axis of an engine;
    a first engine mount link to pivotably couple a first aft mount and a first clevis of the engine, the first aft mount coupled to the first support structure;
    a second support structure coupled at a second position of the wing and at a second side of the nacelle, the first position spaced apart from the second position, the second side opposite the first side and disposed along the longitudinal plane, the longitudinal plane to extend through the first support structure, the second support structure, and the thrust axis;
    a second engine mount link to pivotably couple a second aft mount and a second clevis of the engine, the second aft mount coupled to the second support structure; and
    a third engine mount link to pivotably couple a third aft mount and a third clevis of the engine, the third clevis coupled to the second support structure, in a position of the engine, the first and second clevises of the engine are on a first side of the longitudinal plane and the third clevis of the engine is on an opposing second side of the longitudinal plane, the first and second support structures enable thrust loads from the engine to be reacted through the first and second support structures to the wing.

2. The apparatus of claim 1, wherein the first support structure comprises a first pylon stub and a first thrust beam coupled to the first pylon stub, the first pylon stub coupled to the wing and the first thrust beam coupled to the engine via the first aft mount and the first engine mount link.

3. The apparatus of claim 2, wherein the second support structure comprises a second pylon stub and a second thrust beam coupled to the second pylon stub, the second pylon stub coupled to the wing and the second thrust beam coupled to the engine via the second aft mount, the second engine mount link, the third aft mount, and the third engine mount link.

4. The apparatus of claim 3, wherein the first and second thrust beams are positioned along the longitudinal plane of the engine.

5. The apparatus of claim 1, wherein the longitudinal plane is positioned along or adjacent a centerline of the engine.

6. The apparatus of claim 1, further comprising a first thrust link coupled in a load bearing relationship between a fan assembly and the first aft mount or the second aft mount.

7. The apparatus of claim 6, further comprising a second thrust link coupled in a load bearing relationship between the fan assembly and the other of the first aft mount or the second aft mount.

8. The apparatus of claim 1, further comprising a first fan case mount that couples a fan assembly to the first support structure along the longitudinal plane and a second fan case mount that couples the fan assembly to the second support structure along the longitudinal plane, the second fan case mount opposite the first fan case mount.

9. The apparatus of claim 1, wherein, to separate a fuel source from an ignition source, the fuel source is positioned in the first support structure and the ignition source is positioned in the second support structure.

10. The apparatus of claim 1, further comprising a first link and a second link to couple the first support structure to the wing and a third link and a fourth link to couple the second support structure to the wing, the links are received by respective clevises of the wing.

11. The apparatus of claim 1, wherein the nacelle includes one or more of an inlet, a fan duct, a core duct, a fan cowling, a core cowling, a fan nozzle, a core nozzle, a fan, or a thrust reverser.

12. An apparatus, comprising:
    a first support structure to be coupled to a first position of a wing and a first side of a nacelle along a longitudinal plane intersecting a thrust axis of an engine;
    a second support structure to be coupled to a second position of the wing and a second side of the engine opposite the first side along the longitudinal plane, the second side spaced apart from the first position, the longitudinal plane to extend through the first support structure, the second support structure, and the thrust axis;
    a first aft mount coupled to the first support structure and pivotably coupled to a first clevis of the engine;
    a second aft mount coupled to the second support structure and pivotably coupled to a second clevis of the engine; and
    a third aft mount coupled to the second support structure and pivotably coupled to a third clevis of the engine, the third aft mount to be disposed at a first distance from the longitudinal plane and a second distance from the wing, the second distance is greater than the first distance, the first and second support structures enable thrust loads from the engine to react through the first and second support structures.

13. A method to enhance support of an engine, comprising:
    attaching a first support to a first position of a wing;
    attaching the first support to a first side of the engine along a longitudinal plane along a thrust axis of the engine by attaching a first aft mount of the first support to a first clevis of the engine via a first engine mount link;

attaching a second support to a second position of the wing, the second position spaced apart from the first position, the longitudinal plane to extend through the first support structure, the second support structure, and the thrust axis; and attaching the second support to a second side of the engine by attaching a second aft mount of the second support to a second clevis of the engine via a second engine mount link and attaching a third aft mount of the second support to a third clevis of the engine via a third engine mount link, the second side of the engine opposite the first side of the engine, in a position of the engine, the first and second clevises are on a first side of the longitudinal plane and the third clevis is on an opposing second side of the longitudinal plane, the attaching of the first and second supports to opposing sides of the engine along the longitudinal plane enables thrust loads to react through the first and second supports.

14. The method of claim 13, further comprising positioning a fuel source in the first support and positioning an ignition source in the second support.

15. The apparatus of claim 1, wherein the first and second support structures are coupled to the engine along the longitudinal plane and spaced apart from a thrust reverser cover to enable the thrust reverser cover to move to enable the engine to provide reverse thrust to increase braking of an aircraft.

16. The apparatus of claim 1, wherein the nacelle comprises:
a first portion coupled to the first support structure and the second support structure; and
a second portion rotatably coupled to the first portion via a hinge to provide access to the engine, the first portion and the second portion having substantially similar cross-sections.

17. The apparatus of claim 1, wherein the first aft mount comprises:
a first leg coupled to a bracket that couples a first pylon stub and a first thrust beam of the first support structure; and
a second leg coupled to the first thrust beam,
the first leg and the second leg converge to define an aperture that is to receive the first engine mount link coupled to the engine.

18. The apparatus of claim 1, wherein the first support structure and the second support structure are rigid.

19. An apparatus, comprising:
a nacelle;
a first support structure coupled between a wing and a first side of the nacelle along a thrust axis of an engine;
a second support structure coupled between the wing and a second side of the nacelle along the thrust axis, the first support structure spaced apart from the second support structure on the wing, a longitudinal plane to extend through the first support structure, the second support structure, and the thrust axis;
a first mount coupled to the first support structure and pivotably coupled to the engine;
a second mount coupled to the second support structure and pivotably coupled to the engine;
a third mount coupled to the second support structure and pivotably coupled to the engine, the third mount to be disposed at a first distance from the longitudinal plane and a second distance from the wing, the second distance is greater than the first distance, the first support structure to be rigidly fixed relative to the wing to substantially prevent movement of the engine by the first support structure, the second support structure to be rigidly fixed relative to the wing to substantially prevent movement of the engine by the second support structure, the first and second support structures to be coupled to opposite sides of the engine to enable thrust loads to be reacted through the first and second support structures to the wing.

20. The apparatus of claim 19, wherein the first support structure and the second structure support structure do not substantially extend into a dimensional envelope of the nacelle.

21. The apparatus of claim 19, further comprising:
a first engine mount link to pivotably couple the first mount and the engine at a first position;
a second engine mount link to pivotably couple the second mount and the engine at a second position; and
a third engine mount link to pivotably couple the third mount and the engine at a third position, a second plane intersecting the first position and the thrust axis, the second position and the third position being radially spaced apart from the second plane.

22. The apparatus of claim 19, further including a space defined by an upper surface of the nacelle, the first support structure, the second support structure, and the wing, the space being free of any additional support structures directly coupling the nacelle to the wing to enable a thrust reverser cover to move to enable the engine to provide reverse thrust to increase braking of an aircraft.

23. An apparatus, comprising:
a nacelle;
a first support structure coupled between a wing and a first side of the nacelle along a thrust axis of an engine;
a second support structure coupled between the wing and a second side of the nacelle along the thrust axis, the first support structure spaced apart from the second support structure on the wing, a longitudinal plane to extend through the first support structure, the second support structure, and the thrust axis;
a first mount coupled to the first support structure and pivotably coupled to the engine;
a second mount coupled to the second support structure and pivotably coupled to the engine; and
a third mount coupled to the second support structure and pivotably coupled to the engine, the third mount to be disposed at a first distance from the longitudinal plane and a second distance from the wing, the second distance is greater than the first distance, the first and second support structures disposed on opposite sides of the engine to enable thrust loads from the engine to be reacted through the first and second support structures to the wing.

* * * * *